(12) United States Patent
Taketani

(10) Patent No.: US 10,373,293 B2
(45) Date of Patent: Aug. 6, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Akihito Taketani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/801,098

(22) Filed: Nov. 1, 2017

(65) Prior Publication Data
US 2018/0130181 A1 May 10, 2018

(30) Foreign Application Priority Data
Nov. 4, 2016 (JP) .................................. 2016-216634

(51) Int. Cl.
| G06T 3/40 | (2006.01) |
| G06T 7/11 | (2017.01) |
| G06T 7/174 | (2017.01) |
| G06T 7/70 | (2017.01) |
| G06T 15/20 | (2011.01) |
| G06T 15/30 | (2011.01) |
| G06T 19/00 | (2011.01) |

(52) U.S. Cl.
CPC ............ *G06T 3/4076* (2013.01); *G06T 7/11* (2017.01); *G06T 7/174* (2017.01); *G06T 7/70* (2017.01); *G06T 15/205* (2013.01); *G06T 15/30* (2013.01); *G06T 19/006* (2013.01); *G06T 2207/10016* (2013.01); *G06T 2207/20182* (2013.01); *G06T 2207/20221* (2013.01)

(58) Field of Classification Search
None
See application file for complete search history.

(56) References Cited

U.S. PATENT DOCUMENTS

| 8,369,649 B2 * | 2/2013 | Nagumo | G06T 3/4053 |
| | | | 382/275 |
| 2011/0052095 A1 * | 3/2011 | Deever | G06T 3/4076 |
| | | | 382/300 |
| 2012/0327259 A1 * | 12/2012 | Tamura | G06T 5/009 |
| | | | 348/222.1 |
| 2017/0132769 A1 * | 5/2017 | Barron | G06K 9/42 |
| 2017/0337476 A1 * | 11/2017 | Gordon | G06N 5/022 |

FOREIGN PATENT DOCUMENTS

JP   2009-121870 A   6/2009

* cited by examiner

*Primary Examiner* — Duane N Taylor, Jr.
(74) *Attorney, Agent, or Firm* — Canon U.S.A., Inc. IP Division

(57) ABSTRACT

A first image and a second image with resolutions different from each other are generated from an image captured by an imaging unit, and the first image and the second image are subject to different types of image processing. A virtual image is generated by calculating a position and an orientation of the imaging unit based on the processed first image. A composite image is generated by combining the generated virtual image with the second image subjected to the image processing, and the generated composite image is used as a display image.

12 Claims, 5 Drawing Sheets

IMAGE PROCESSING APPARATUS, IMAGE PROCESSING METHOD, AND STORAGE MEDIUM

BACKGROUND

Field of the Disclosure

The present disclosure relates to a technology for processing image data captured by an imaging apparatus.

Description of the Related Art

In recent years, so-called Mixed Reality (MR) technology has been known as a technology for seamlessly merging a real world and a virtual world in real time. A technology using a video see-through head mounted display (HMD) is known as one type of the MR technology. According to this technology, an image of a real space observed by a HMD wearer (user) is captured with a camera (an imaging unit). Further, a virtual image is generated by rendering using computer graphics (CG), based on the position and the direction of the imaging unit. The virtual image is combined with the captured image, so that a composite image is generated. The composite image is displayed on a display device such as a liquid crystal display or an organic electroluminescence (EL) display, so that the user can observe the composite image.

Assume that, in such a MR system, an imaging device of the imaging apparatus is made to have a higher pixel density in order to achieve higher image quality. In this case, the total amount of data to be processed and transmitted increases, which enlarges the system. Therefore, it is conceivable that video images may be generated by segmenting an image by converting a resolution or clipping a part of the image, depending on the use purpose of the image. The generated video images are to be used for different purposes in a subsequent stage of the system. Therefore, it is desirable to apply appropriate image processing to each of the video images.

Japanese Patent Application Laid-Open No. 2009-121870 discusses a related technology as follows. According to this technology, in a vehicle-mounted stereoscopic camera range-finding apparatus, video images are obtained from identical imaging devices, and then divided into a video image for monitoring, and a video image for a stereoscopic image processing circuit. Subsequently, non-linear processing about luminance is performed only on the video image for monitoring.

However, Japanese Patent Application Laid-Open No. 2009-121870 discusses nothing about performing appropriate image processing corresponding to a use purpose, on each of video images generated by segmentation in a MR system.

SUMMARY

According to an aspect of the present invention, an image processing apparatus includes a first generation unit configured to generate a first image with a predetermined resolution and a second image with a resolution higher than the predetermined resolution, based on an image captured by an imaging unit, a first processing unit configured to perform first image processing on the generated first image, a second processing unit configured to perform second image processing, which is different from the first image processing, on the generated second image, a derivation unit configured to derive a position and a direction of the imaging unit, based on the processed first image, a second generation unit configured to generate a virtual image, based on the derived position and direction, and a composition unit configured to generate a composite image based on the processed second image and the generated virtual image.

Further features of the present invention will become apparent from the following description of exemplary embodiments with reference to the attached drawings.

DESCRIPTION OF THE EMBODIMENTS

Figure 1:
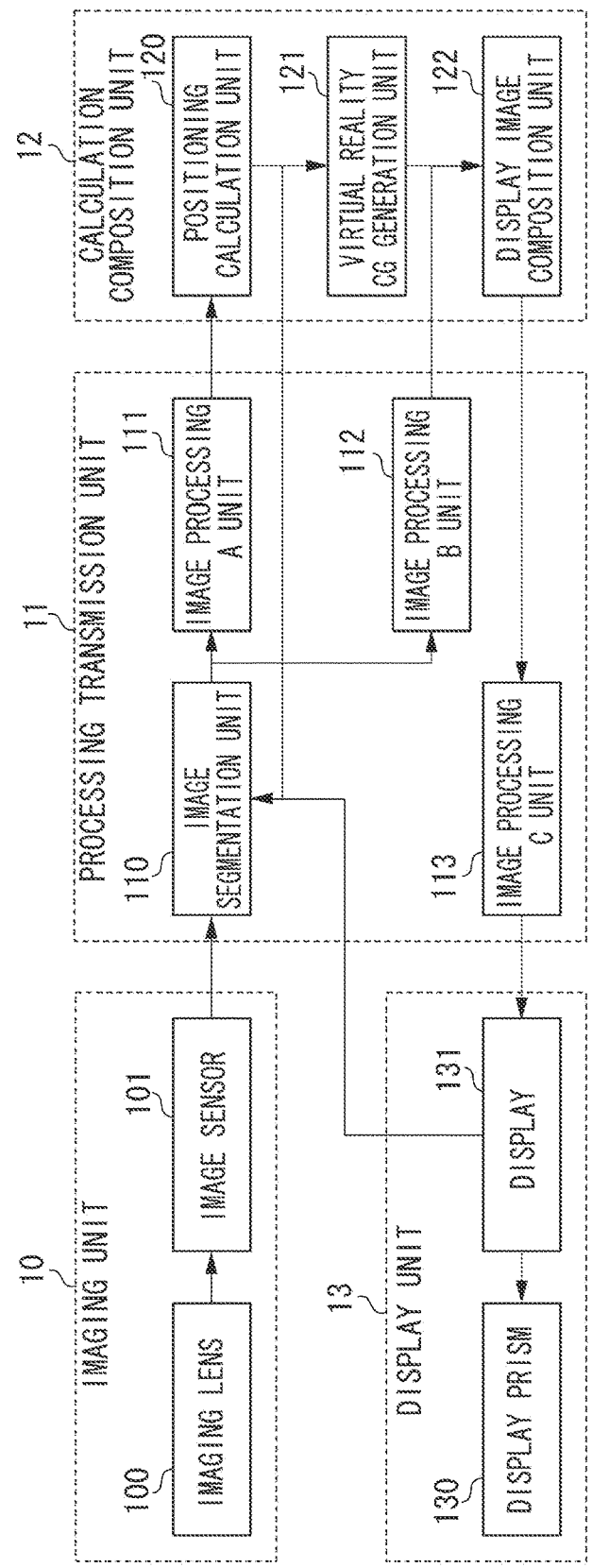
FIG. 1 is a block diagram illustrating an image display system according to a first exemplary embodiment.

A first exemplary embodiment of the present invention will be described below with reference to the drawings. FIG. 1 is a schematic block diagram illustrating a configuration of an image display system according to the present exemplary embodiment. The image display system according to the present exemplary embodiment is broadly divided into four parts, as illustrated in FIG. 1. The image display system has an imaging unit 10 and a processing transmission unit 11. The imaging unit 10 generates a captured video image. The processing transmission unit 11 performs segmentation and image generation for the captured video image. The processing transmission unit 11 also performs image processing on the captured video image, and image processing on a display video image. The image display system further has a calculation composition unit 12 and a display unit 13. The calculation composition unit 12 executes positioning calculation, various kinds of calculation for generating a virtual reality computer graphics (CG) image, and processing for combining images into the display video image. The display unit 13 displays the display video image to be visually recognized by an experiencing person.

The imaging unit 10 and the display unit 13 are provided in a head mounted display (HMD) that corresponds to an image display apparatus in the present system. On the other hand, the processing transmission unit 11 and the calculation composition unit 12 are provided in a personal computer (PC) that corresponds to an image processing apparatus in the present system. The HMD and the image processing apparatus (PC) are connected to each other by a wired scheme or a wireless scheme. The HMD and the image processing apparatus (PC) each have a hardware configuration including a central processing unit (CPU), a read only memory (ROM), and a random access memory (RAM). The CPU executes a program stored in a storage such as the ROM or a hard disk (HD), thereby implementing, for example, each function configuration and processing in a flowchart, which will be described below. The RAM has a storage area that functions as a work area for the execution of the program by the CPU. The ROM has a storage area for storing the program to be executed by the CPU.

In addition, the image display apparatus in the present system is a so-called video see-through HMD, which displays a video image of a real space on which a CG image is superimposed. In this type of HMD, it is important to render a virtual reality object viewed from a specific position and a specific orientation, as a CG image, in such a manner that the virtual reality object substantially matches with a line of sight of a user. For such position and orientation adjustment, some technology uses components such as sensors for sensing acceleration and angular velocity as well as a global positioning system (GPS). In the present exemplary embodiment, however, the HMD includes an imaging sensor. Therefore, if there is a marker or a spatial feature point within a captured video image, the calculation composition unit 12 can implement the adjustment of the position and orientation as well as the superimposition of the CG image, with high accuracy. A captured video image for such positioning calculation is expected to have a wide viewing angle, rather than having a high resolution. On the other hand, as for a captured video image to be displayed on the display unit 13 of the HMD as a video see-through background image, the resolution of this captured video image is desirably as high as possible to be suitable for a display viewing angle.

In this way, two or more types of video images coexist for different requirements, due to differences in use purpose in the subsequent stage of the system, even if these images are derived from the same captured video image. Using this feature, in the present exemplary embodiment, a video image is segmented in the processing transmission unit 11 to improve performance of the subsequent stage of the system. A configuration for implementing such an improvement will be described. The calculation composition unit 12 performs the positioning calculation by using a stereoscopic camera, which is an example of calculation composition processing. There may be adopted another type of configuration that uses processing for requiring video images with different resolutions, such as face detection processing or object recognition processing.

Each functional unit of the image display system according to the present exemplary embodiment will be described in detail below. The imaging unit 10 includes an imaging lens 100 and an image sensor 101. The imaging lens 100 is an imaging optical system, and the image sensor 101 is an imaging device. The imaging unit 10 obtains a captured video image, by causing the image sensor 101 to perform photoelectric conversion of an object image formed via the imaging lens 100. It is desirable for the imaging lens 100 to have a wide viewing angle for the positioning calculation as described above. The image sensor 101 includes a semiconductor sensor such as a complementary metal oxide semiconductor (CMOS) image sensor or a charge-coupled device (CCD) image sensor. Spectral sensitivity is different for each imaging device and therefore, it is necessary to adjust color and brightness by performing image processing.

The display unit 13 includes a display prism 130 and a display 131. The display 131 displays a display video image resulting from the composition in the calculation composition unit 12. A light beam forms an image on an observer via the display prism 130. The display prism 130 may be a lens, or may be unnecessary, depending on the configuration of the HMD. The display 131 includes a display device such as a liquid-crystal display panel or an organic EL panel. Color reproduction is different for each display and therefore, it is necessary to adjust color and brightness by performing image processing, as with the imaging device.

The processing transmission unit 11 has an image segmentation unit 110. The image segmentation unit 110 generates a plurality of video images by performing resolution conversion and clipping processing, from the same captured video image. The processing transmission unit 11 further has an image processing A unit 111, an image processing B unit 112, and an image processing C unit 113. The image processing A unit 111 processes a captured image after the resolution conversion. The image processing B unit 112 processes a clipped captured image. The image processing C unit 113 processes a composite image. The image processing A unit 111, the image processing B unit 112, and the image processing C unit 113 execute different types of image processing. In the present exemplary embodiment, the captured video image is segmented into two in the image segmentation unit 110. However, the captured video image may be segmented into three or more, depending on the requirement in the subsequent stage of the system.

The calculation composition unit 12 includes a positioning calculation unit 120, a virtual reality CG generation unit 121, and a display image composition unit 122. The positioning calculation unit 120 detects a marker or a feature point from a captured video image, and thereby derives the position and the orientation of the HMD (the imaging unit) by calculation. The virtual reality CG generation unit 121 generates a virtual reality CG image to be superimposed on the captured video image, by rendering a virtual reality object, from the position and the orientation derived by the positioning calculation unit 120. The display image composition unit 122 generates a composite image, by combining a background image clipped by the image segmentation unit 110 based on the requirement of the display unit 13, with the virtual reality CG image. The calculation and the combining processing often need enormous amounts of calculation, and consume many system resources as pixel density increases. Therefore, an apparatus such as a high-end PC or a workstation is often used.

Figure 2:
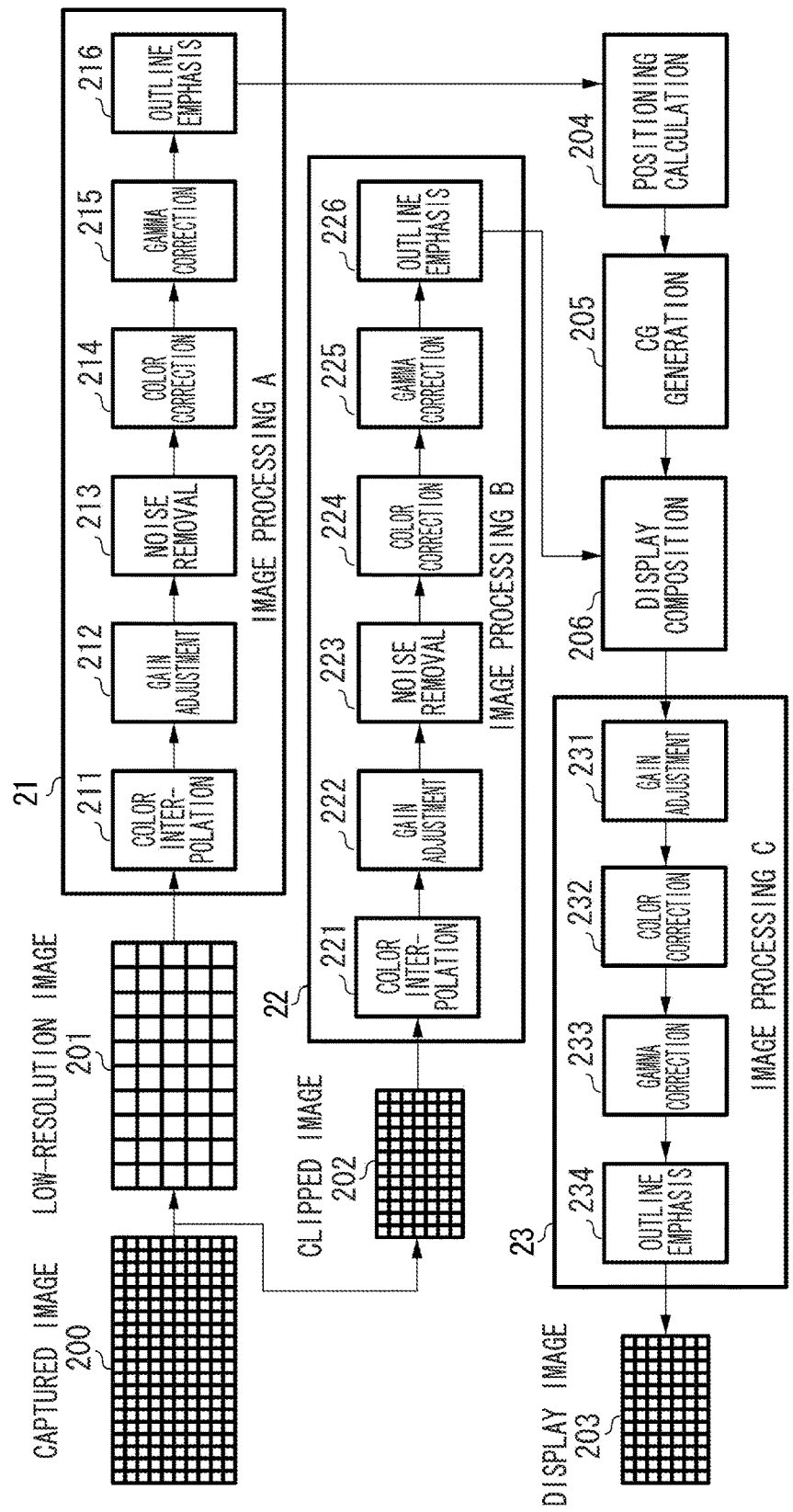
FIG. 2 is a conceptual diagram illustrating image processing in the image display system according to the first exemplary embodiment.

Next, a flow of image processing in the image display system according to the present exemplary embodiment will be described with reference to FIG. 2. In FIG. 2, a captured image 200 is an image captured by the image sensor 101, and represents an image having a wide viewing angle and a high resolution. The image segmentation unit 110 generates a low-resolution image 201 and a clipped image 202, by segmenting the captured image 200 into these images. The low-resolution image 201 is an image having a wide viewing angle and a low resolution, and obtained by resolution conversion of the captured image 200. The clipped image 202 is an image having a narrow viewing angle and a high resolution, and obtained by clipping a part of the captured image 200. Various schemes including pixel mixture and simple culling are present for the resolution conversion. In the present exemplary embodiment, the resolution conversion is not limited to a specific scheme. The viewing angle of the clipped part is a part of the original viewing angle. In this way, two images are generated here, one is an image (the low-resolution image 201) indicating a predetermined region based on a predetermined resolution, and the other is an image (the clipped image 202) indicating a part of the predetermined region based on a resolution higher than the predetermined resolution.

Here, the clipped image 202 is generated by clipping a part of the captured image 200, so that the low-resolution image 201 and the clipped image 202 are different in terms of display region (viewing angle). However, in a stage where the processing in the image segmentation unit 110 is performed, the viewing angle of the clipped image 202 may remain equal to that of the captured image 200, and then the clipped image 202 may be clipped at predetermined timing before a display image 203 is generated. Further, a processing load in the subsequent stage is preferably reduced, by generating the low-resolution image 201 and the clipped image 202 in such a manner that the total data amount of the low-resolution image 201 and the clipped image 202 is smaller than the data amount of the captured image 200.

Image processing A 21 is applied to the low-resolution image 201 having a wide viewing angle and a low resolution. The image processing A 21 is performed by the image processing A unit 111. In the image processing A 21, color interpolation 211, gain adjustment 212, noise removal 213, color correction 214, gamma correction 215, and outline emphasis 216 are executed in this order. This processing order may be changed according to the system, and/or another process may be added. It is conceivable that, since the color interpolation 211 is influenced by the resolution conversion performed in the image segmentation unit 110, the color interpolation 211 may be executed before the resolution conversion. It is desirable for the gain adjustment 212 to be fixed to stabilize calculation in the subsequent stage. It is desirable for the noise removal 213 to be noise removal in a space direction rather than being noise removal in a time direction, when importance is placed on calculation within one frame in the subsequent stage. It is desirable for the color correction 214 and the gamma correction 215 to be image processing for emphasizing a marker feature and a natural feature, in order to quickly stabilize calculation for derivation of a marker and a feature point. It is also desirable for the outline emphasis 216 to be stronger processing, in order to detect an edge easily. However, since a change occurs in edge shape because of the resolution conversion described above, it is desirable to perform the processing in consideration of this change.

Image processing B 22 is applied to the clipped image 202 having a narrow viewing angle and a high resolution. The image processing B 22 is performed by the image processing B unit 112. In the image processing B 22, color interpolation 221, gain adjustment 222, noise removal 223, color correction 224, gamma correction 225, and outline emphasis 226 are executed in this order. This processing order may be changed according to the system, and/or other process may be added. It is conceivable that the color interpolation 221 may be executed before the resolution conversion in the image segmentation unit 110. It is desirable for the gain adjustment 222 to be adjustment for easy viewing by human eyes. It is desirable for the noise removal 223 to be noise removal in a time direction rather than being noise removal in a space direction, in order to obtain a result suitable for the characteristics of human eyes. It is desirable for the color correction 224 and the gamma correction 225 to be image processing for achieving high reproducibility, in order to reproduce the natural original image faithfully. It is also desirable for the outline emphasis 226 to be processing for avoiding abnormality when an image is viewed by human eyes, by refraining from excessively emphasizing an edge.

Positioning calculation 204 is executed by the positioning calculation unit 120. The positioning calculation 204 derives the position and the orientation of the HMD (the imaging unit), by detecting a marker or a feature point from the image on which the image processing A 21 is performed. CG generation 205 is executed by the virtual reality CG generation unit 121. The CG generation 205 performs CG generation according to a calculation result (the position and the orientation of the imaging unit) of the positioning calculation 204. Display composition 206 is executed by the display image composition unit 122. The display composition 206 combines the generated CG video image, with the clipped image 202 to which the image processing B 22 has been applied.

Image processing C 23 is applied to a composite video image resulting from the display composition 206. The image processing C 23 is performed by the image processing C unit 113. In the image processing C 23, gain adjustment 231, color correction 232, gamma correction 233, and outline emphasis 234 are executed in this order. This processing order may be changed according to the system, and/or another process may be added. The display 131 of the HMD displays the display image 203 obtained by applying the image processing C 23 to the composite image. Therefore, in a series of steps of the image processing C 23, it is desirable to perform adjustment according to component characteristics of the display 131.

In this way, the performance of the positioning calculation 204 is improved by adjusting the image processing A 21, and the video image is generated by the composition in the display composition 206 as an easy-to-view image for human eyes, by adjusting the image processing B 22. In addition, an appropriate video image is displayed in the display 131, by adjusting the image processing C 23. In other words, the performance of each unit is improved by generating a plurality of images by segmenting a captured video image into these images, and then applying different image processing methods and image processing amounts to these images for different uses. Further, a circuit scale can be reduced by eliminating unnecessary image processing in view of the resources of the entire system.

Figure 3:
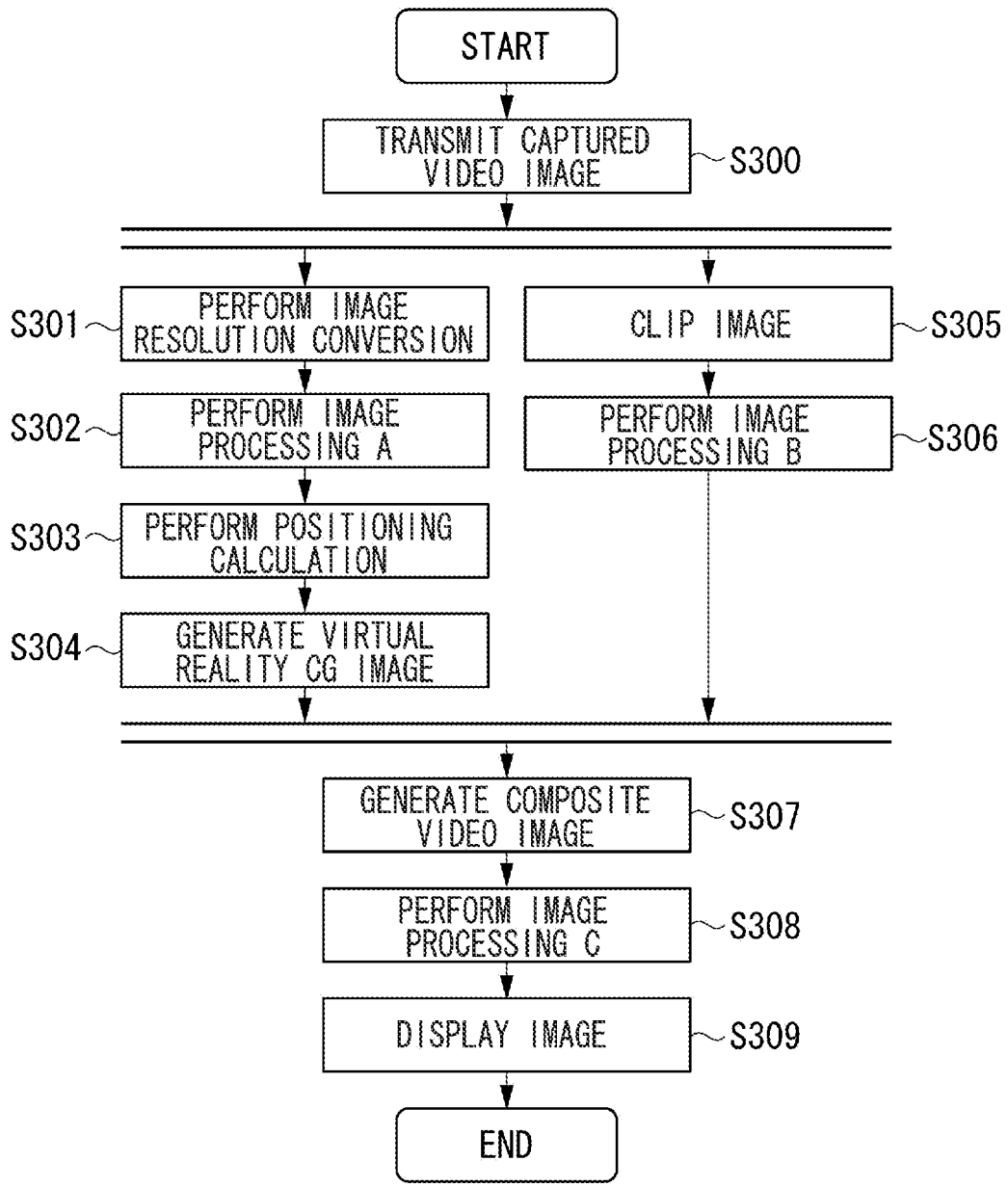
FIG. 3 is a flowchart illustrating processes of a video-image transmission procedure according to the first exemplary embodiment.

Next, a video-image transmission procedure in the present exemplary embodiment will be described. FIG. 3 is a flowchart illustrating the video-image transmission procedure in the present exemplary embodiment.

In step S300, the CPU of the HMD transmits a video image captured by the imaging unit 10, to the image segmentation unit 110 provided in the processing transmission unit 11. The video image transmitted here has a wide viewing angle and a high resolution as described above. Afterward, step S301 to step S304 and step S305 to step S306 are performed in parallel.

In step S301, the image segmentation unit 110 performs the resolution conversion of the captured video image, based on a resolution required for the calculation to be performed in the positioning calculation unit 120. In step S302, based on an image required for the calculation to be performed in the positioning calculation unit 120, the image processing A unit 111 performs the image processing A including the gain adjustment, the color correction, and the noise removal, on the video image resulting from the resolution conversion. In step S303, the positioning calculation unit 120 estimates the position and the orientation of the HMD (the imaging unit) from the calculation, by detecting a marker or a spatial feature point within the captured video image. In step S304, based on information indicating the position and orientation estimated in step S303, the virtual reality CG generation unit 121 generates a virtual reality CG image, by rendering a virtual reality object viewed from the estimated position and orientation.

Meanwhile, step S305 begins in parallel with step S301. In step S305, the image segmentation unit 110 clips an image of a resolution required based on specifications of the display image composition unit 122 or the display 131, from the video image captured by the image sensor 101. In step S306, the image processing B unit 112 performs the image processing B including various kinds or processing, on the clipped image. The image processing B is performed to obtain an image faithful to the natural original image, in such a manner that the obtained image is desirable when viewed by human eyes.

Next, in step S307, the display image composition unit 122 generates a composite video image, by combining the video image clipped by the image segmentation unit 110 to be used for a background, with the virtual reality CG image generated by the virtual reality CG generation unit 121. In step S308, the image processing C unit 113 performs the image processing C on the generated composite video image, according to the characteristics of the display 131. The image processing C includes various kinds of processing such as the gain adjustment and the color correction. In step S309, the display unit 13 displays a display video image resulting from the composition performed by the display image composition unit 122 and the image processing C performed by the image processing C unit 113.

As described above, according to the present exemplary embodiment, the user can experience a video see-through background video image substantially matching with a line of sight of the user, and a virtual reality space on which a virtual reality object CG image viewed from the position and orientation of the user is superimposed, through the HMD. In addition, the image processing A unit 111, the image processing B unit 112, and the image processing C unit 113 perform different kinds of image processing for different requirements. Therefore, the positioning accuracy improves, resulting in a video image easily viewed by human eyes. Accordingly, the performance of the entire system is enhanced.

Next, a second exemplary embodiment of the present invention will be described. In the first exemplary embodiment, it is possible to execute the image processing suitable for each piece of captured video data generated by segmentation. However, in such an image processing apparatus, it is conceivable that the status of the image processing may change over time, according to the system configuration. Examples of the change according to the system configuration include a case where software for detecting a monochrome marker is switched to software for detecting a color feature point for the calculation performed in the calculation composition unit 12. The examples further include a case where the HMD including the imaging unit 10 and the display unit 13 is replaced with another. When the HMD is replaced, the spectral sensitivity of the image sensor 101 changes, and the characteristics of the display 131 also change. Therefore, it is desirable that the image processing change as well. Examples of the change over time include a situation where luminance and color greatly change as a subject changes by moving from an indoor place to an outdoor place, and a situation where the appearing sizes of a marker and a feature point change. In such situations, the change cannot be addressed with only one type of image processing and thus, the performance cannot be delivered. Therefore, the present exemplary embodiment aims to allow dealing with changes, such as a change of the system configuration of an image display system, and a change over time of an external environment. Configurations similar to those already described in the first exemplary embodiment will be provided with the same reference numerals as those of the first exemplary embodiment and will not be described.

Figure 4:
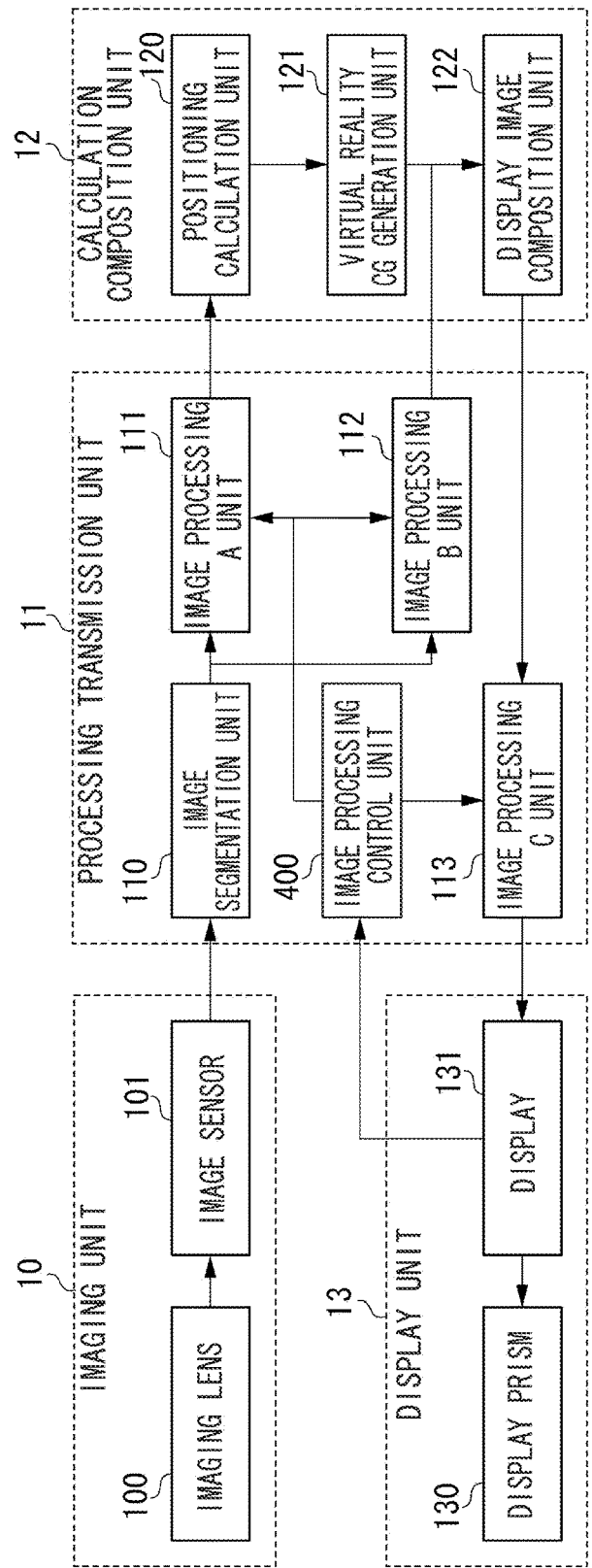
FIG. 4 is a block diagram illustrating an image display system according to a second exemplary embodiment.

FIG. 4 is a block diagram illustrating a configuration of an image display system according to the present exemplary embodiment. A point different from that of the first exemplary embodiment is that an image processing control unit 400 is added to the processing transmission unit 11. The image processing control unit 400 is connected to each functional unit of the image display system, and monitors the status of necessary image processing. Further, based on requirements from the positioning calculation unit 120 and the display image composition unit 122, the image processing control unit 400 instructs each of the image processing A unit 111, the image processing B unit 112, and the image processing C unit 113 to change the image processing method and the image processing amount. The image processing amount include parameters used in various kinds of image processing and thresholds in processing.

For example, in a case where a change from full color to monochrome occurs, or in a case where a system configuration is changed, other performance such as delay can be improved by deleting the related image processing itself. On the contrary, in a case where the processing transmission unit 11 of sufficiently high processing performance is prepared, the performance can be improved by adding a higher degree of image processing according to the requirement of each block.

Figure 5:
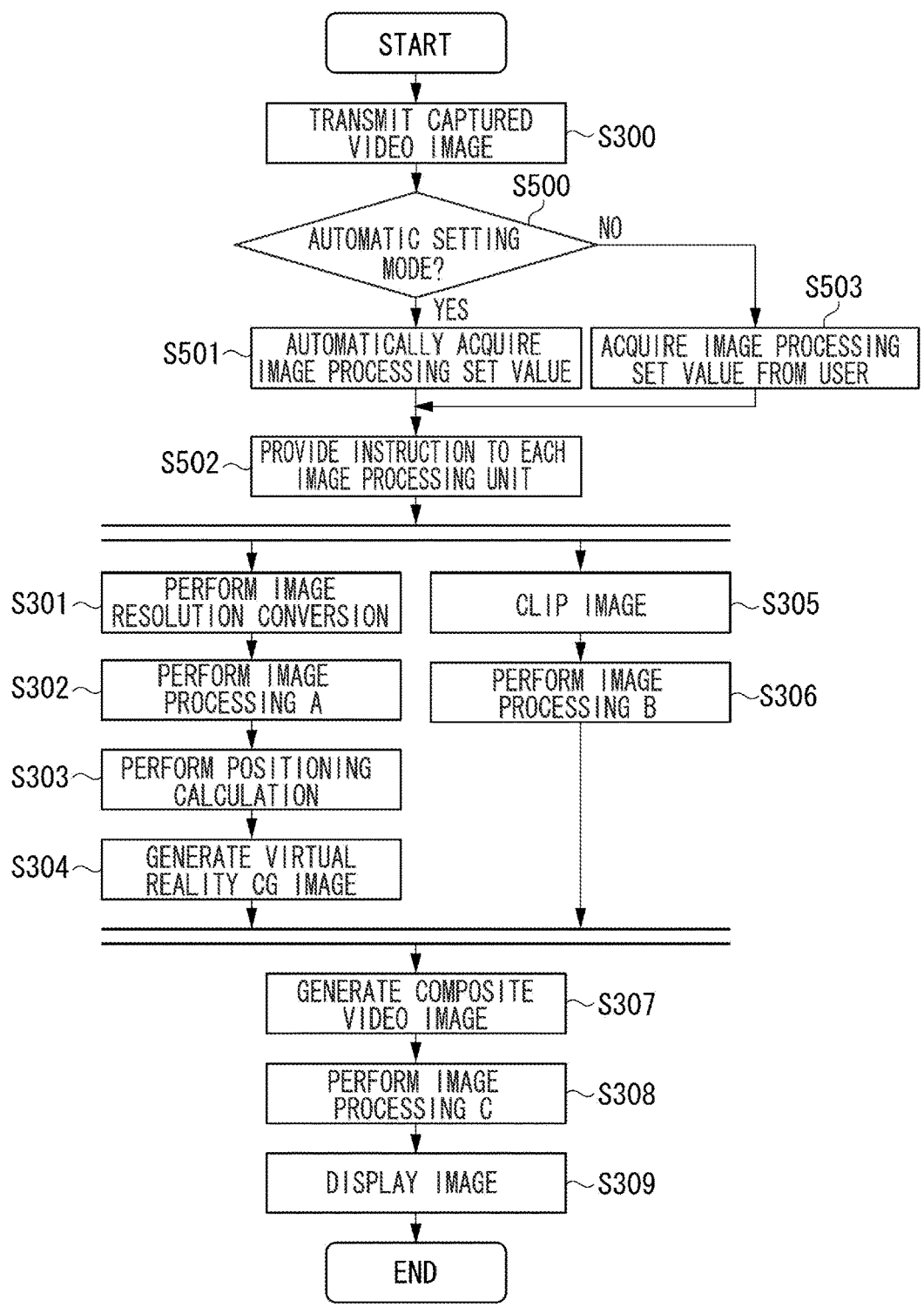
FIG. 5 is a flowchart illustrating processes of a video-image transmission procedure according to the second exemplary embodiment.

FIG. 5 is a flowchart illustrating a video-image transmission procedure in the present exemplary embodiment. The processing of the present exemplary embodiment illustrated in this flowchart is different from that of the first exemplary embodiment, in that step S500 to step S503 are added. Here, in step S500, it is determined whether a method for providing an instruction from the image processing control unit 400 to each of the image processing A unit 111, the image processing B unit 112, and the image processing C unit 113 is an automatic setting mode. Here, the automatic setting mode is a mode in which the system dynamically makes an automatic change to the image processing setting according to the status of each unit. If the method is the automatic setting mode (YES in step S500), the processing proceeds to step S501. If the method is not the automatic setting mode (NO in step S500), the processing proceeds to step S503.

In step S501, the image processing control unit 400 connected to each unit of the system acquires a set value (an image processing amount) for each image processing unit, by performing calculation based on a feedback from each unit of the system. Next, in step S502, the image processing control unit 400 provides an instruction to each image processing unit, based on the set value acquired in step S501.

On the other hand, in step S503, the image processing control unit 400 acquires an image processing set value from a user. In this case, an initial value set in the system can be used, or a set value input beforehand by the user can be used according to a system change. In step S502, based on the set value acquired in either way, the image processing control unit 400 provides an instruction to each image processing unit.

Steps after step S502 are similar to those described in the first exemplary embodiment and therefore will not be described. According to the present exemplary embodiment, the image processing setting of video data can be actively changed. Therefore, the image processing setting of the video data can be changed to improve the performance of the system.

[Other Exemplary Embodiments]

In the configurations described above, the HMD includes the imaging unit 10 and the display unit 13, and the information processing apparatus (PC) includes the processing transmission unit 11 and the calculation composition unit 12. However, the present invention is not limited to such a form. For example, the HMD may include all of the four functional units, and the processing may all be executed only in the HMD.

According to the above-described configurations of the present invention, appropriate image processing corresponding to a use purpose can be performed on each video image generated by segmentation in an MR system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-216634, filed Nov. 4, 2016, which is hereby incorporated by reference herein in its entirety.

What is claimed is:

1. An image processing apparatus comprising:
at least one processor;
at least one memory;
a first generation unit configured to generate a first image with a predetermined resolution and a second image with a resolution higher than the predetermined resolution, based on an image captured by an imaging unit;
a first processing unit configured to perform first image processing on the generated first image;
a second processing unit configured to perform second image processing, which is different from the first image processing, on the generated second image;
a derivation unit configured to derive a position and a direction of the imaging unit by detecting a marker feature or a natural feature in the processed first image;
a second generation unit configured to generate a virtual image, based on the derived position and direction; and
a composition unit configured to generate a composite image based on the processed second image and the generated virtual image,
wherein the first generation unit, the first processing unit, the derivation unit, the second generation unit, and the composition unit are realized by execution of a program stored in the at least one memory by the at least one processor.

2. The image processing apparatus according to claim 1, wherein the first image indicates a predetermined region, and the second image indicates a region corresponding to a part of the predetermined region.

3. The image processing apparatus according to claim 1, wherein the first generation unit generates the first image and the second image in such a manner that a total data amount of the first image and the second image is smaller than a data amount of the image captured by the imaging unit.

4. The image processing apparatus according to claim 1, wherein the first generation unit generates the first image by performing resolution conversion of the image captured by the imaging unit.

5. The image processing apparatus according to claim 1, wherein the first generation unit generates the second image by performing resolution conversion of the image captured by the imaging unit and clipping a part of the captured image.

6. The image processing apparatus according to claim 1, wherein the noise removal in the first image processing is emphasized in a space direction, and the noise removal in the second image processing is emphasized in a time direction.

7. The image processing apparatus according to claim 1, wherein the first image processing and the second image processing each include color correction and gamma correction, the color correction and the gamma correction in the first image processing emphasize a marker feature or a natural feature included in the captured image, and the color correction and the gamma correction in the second image processing provide high reproducibility of the captured image.

8. The image processing apparatus according to claim 1, further comprising a control unit configured to change the first image processing and the second image processing based on a change in a configuration of a system including the image processing apparatus, or a change in an external environment.

9. The image processing apparatus according to claim 1, wherein the image processing apparatus is connected to an image display apparatus including the imaging unit and a display unit.

10. The image processing apparatus according to claim 9, wherein the image display apparatus is a head mounted display.

11. An image processing method comprising:
generating a first image with a predetermined resolution and a second image with a resolution higher than the predetermined resolution based on an image captured by an imaging unit;
performing first image processing on the generated first image;
performing second image processing, which is different from the first image processing, on the generated second image;
deriving a position and a direction of the imaging unit based on the processed first image;
generating a virtual image, based on the derived position and direction; and
generating a composite image by deleting a marker feature or a natural feature in the processed second image and the generated virtual image.

12. A non-transitory computer-readable recording medium that stores a program for causing a computer to function as the units of an image processing apparatus comprising:
- a first generation unit configured to generate a first image with a predetermined resolution and a second image with a resolution higher than the predetermined resolution based on an image captured by an imaging unit;
- a first processing unit configured to perform first image processing on the generated first image;
- a second processing unit configured to perform second image processing, which is different from the first image processing, on the generated second image;
- a derivation unit configured to derive a position and a direction of the imaging unit, by detecting a marker feature or a natural feature in the processed first image;
- a second generation unit configured to generate a virtual image based on the derived position and direction; and
- a composition unit configured generate a composite image, based on the processed second image and the generated virtual image.

* * * * *